June 26, 1951 — E. REDIN — 2,558,628

MILKING MACHINE RINSER

Filed March 14, 1947 — 2 Sheets-Sheet 1

Inventor
Eric Redin
by Sommers + Young
Attorneys

June 26, 1951  E. REDIN  2,558,628
MILKING MACHINE RINSER
Filed March 14, 1947  2 Sheets-Sheet 2
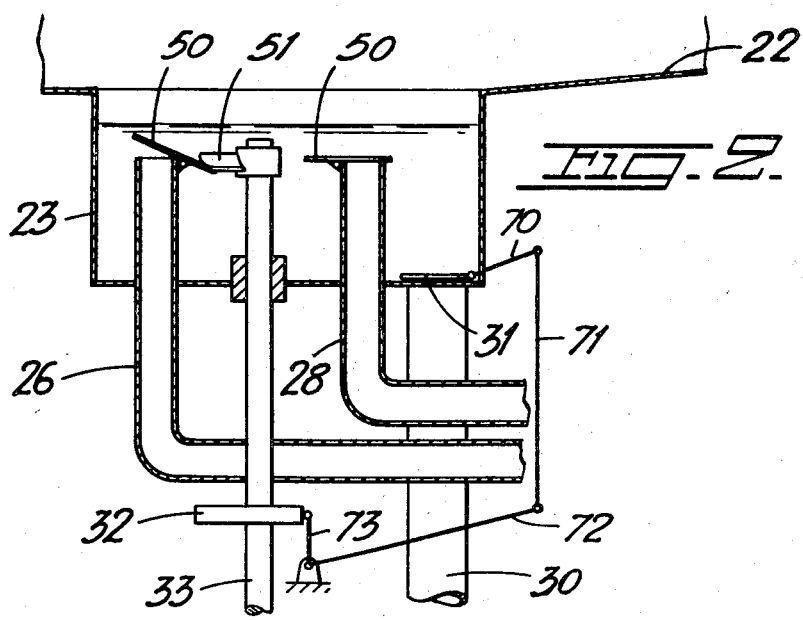
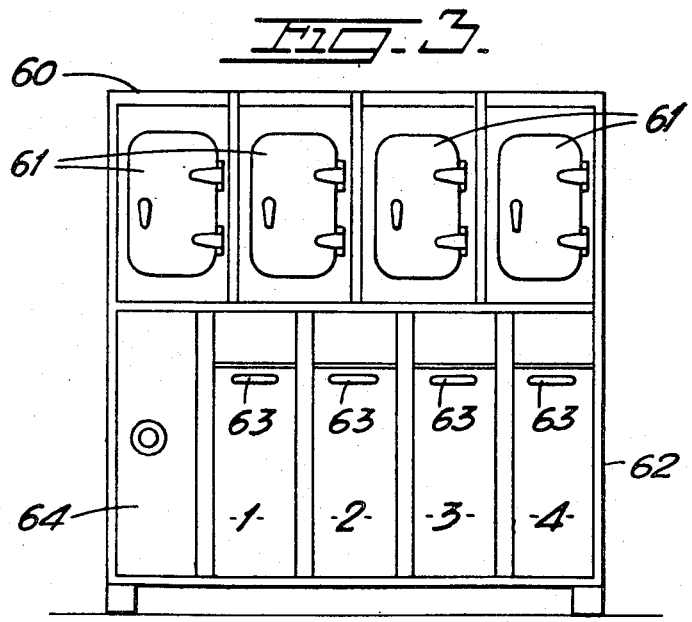
Inventor
Eric Redin
by Sommers + Young
Attorneys Patented June 26, 1951

2,558,628

UNITED STATES PATENT OFFICE 2,558,628

MILKING MACHINE RINSER

Eric Redin, Norrkoping, Sweden

Application March 14, 1947, Serial No. 734,806
In Sweden February 5, 1946

8 Claims. (Cl. 134—95)

The present invention relates to an apparatus for cleansing milking machines and more particularly to an apparatus for rinsing the teat cups and associated elements of milking machines both internally and externally. Hitherto, as a rule, the cleansing of the teat cup clusters and other parts of a milking machine has been performed entirely or substantially by hand and is in such case a very hard and time consuming work.

An object of the invention is to reduce to a minimum the manual work in connection with the cleansing of milking machines by limiting it substantially to the placing of the elements to be cleansed in the rinsing apparatus and removing them therefrom when they are to be again used.

According to a feature of the invention the teat cup clusters and associated tubings and other milk conveying elements of the milking machine are inserted into a fluid circulating system in such a way that the individual teat cups with their respective tubings will form parallel branches of said circulating system, so that fluid under pressure may pass therethrough and effect the rinsing of the interior of the teat cups and associated elements of the milking machine, while at the same time the teat cups and associated elements are subjected to an external cleansing action effected by liquid supplied from stationary spray tubes.

Another feature of the invention resides in the provision of a set of tanks for different rinsing and washing fluids, and means to connect said tanks in a predetermined order into the fluid circulating system.

Other features of the invention will appear from the following description taken in connection with the accompanying drawings.

In the drawings:

Fig. 2 is a vertical section of part of a modified fluid circulating system of a rinsing apparatus according to the invention; and Fig. 3 is a front view of the housing of an apparatus according to the invention.

Figure 1:
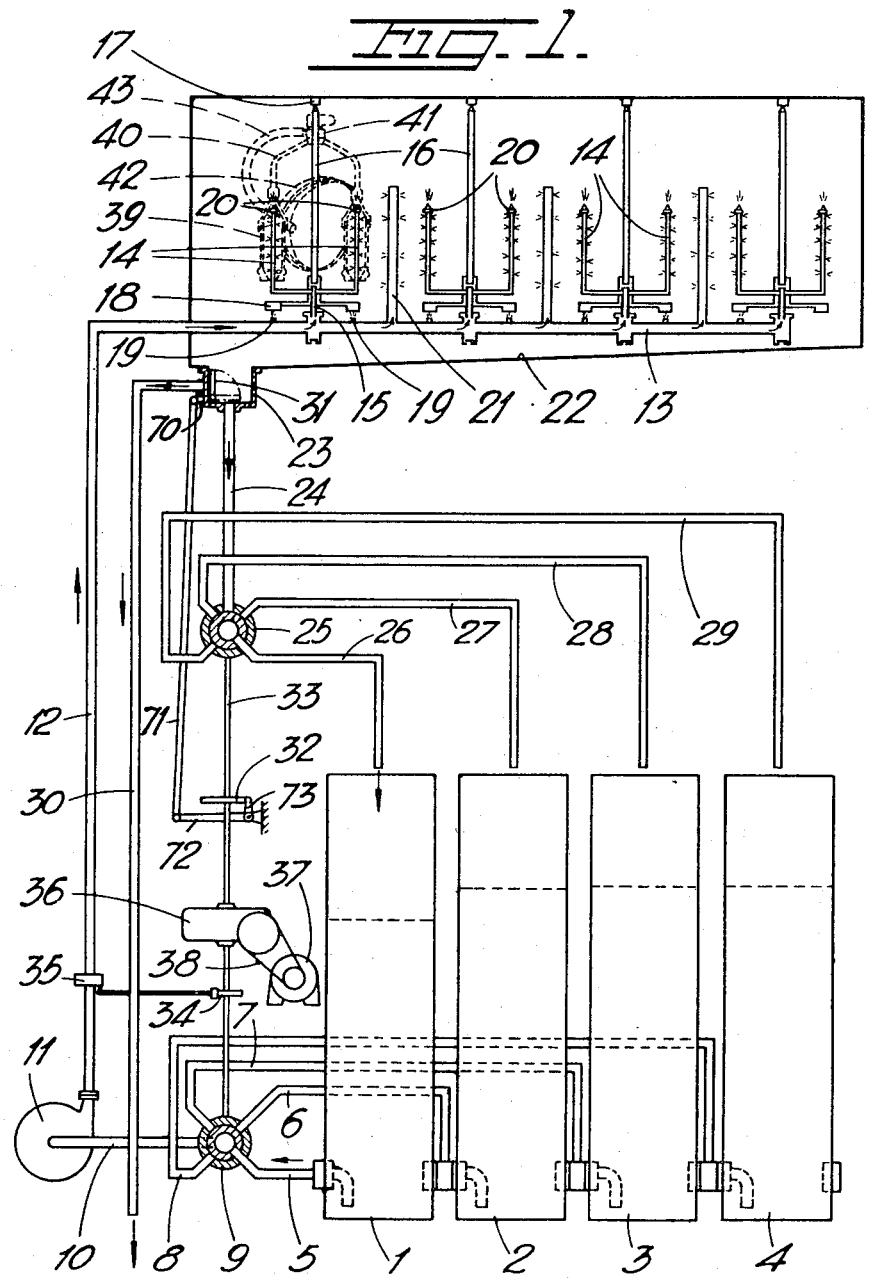
Fig. 1 is a substantially diagrammatic side elevation of an embodiment of the invention.

The various fluids to be used in effecting the rinsing operation according to the invention are contained in a set of tanks 1, 2, 3, 4, Fig. 1. Said fluid may comprise, for instance, cold water, hot water containing a cleansing agent, hot washing water and a disinfection liquid in the order stated. Extending from the bottom portion of each tank is a conduit 5, 6, 7 and 8, respectively, leading to a four-way valve 9 by means of which one conduit at a time may be connected to the suction conduit 10 of a liquid pump 11. The pressure conduit 12 of said pump is connected to a distributing pipe 13 common to a plurality of carriers for supporting the teat cups and other elements of the milking machine to be cleansed. In the drawing four such carriers are shown; in practice, however, any desired number thereof may be used.

Each individual carrier consists of a frame like a spider having four arms each of which supports an upstanding spray tube 14. In order not to render the drawing entangled two such arms only with their respective spray tubes are shown. The arms and spray tubes are made of pipes and communicate with the distributing pipe 13 through a hollow shaft 15 rotatably mounted in a housing formed integrally with the distributing pipe or rigidly connected thereto. By means of a vertical stem 16 extending on a line with the hollow shaft 15 the frame is mounted at its top in an upper bearing 17. The frame is adapted to rotate at a moderate speed during the performance of the rinsing operation. To this end it may be positively driven either from a separate source of power, for instance, via stem 16 or, as shown in Fig. 1, by the action of the fluid under pressure passing through pipe 13. To this end the spider arms carry a set of blades 18 adapted to be acted on by the fluid under pressure delivered from the feed pipe 13 through a pair of nozzles 19. The spray tubes 14 are provided with holes at different levels and carry at their top ends upwardly directed nozzles 20. Extending from the feed pipe 13 at points intermediate between the various rotatable frames are stationary spray tubes 21 formed with spray holes or nozzles directed towards the rotatable frames.

Provided below the feed pipe 13 and the set of rinsing frames thereon is a flute having an inclined bottom 22 for collecting the waste liquid running off from the frames and the milking machine parts supported thereby and passing said liquid to a basin 23. Extending from the bottom of said basin 23 is a depending pipe 24 leading to a four-way valve 25 by means of which pipe 24 may be put into communication with any of four return pipes 26, 27, 28, and 29, each leading to a separate one of the tanks 1, 2, 3 and 4.

Extending from the basin 23 is also a drain pipe 30. The communication between pipes 24 and 30 and the interior of the basin 23 is controlled by means of a flap valve 31 in such a way that but one of said pipes may be in communication with the basin at a time. Valve 31 is operated by means of a link system 70—73 in turn controlled by a cam 32 on a control shaft 33 common to the four-way valves 9 and 25. Another cam 34 on said shaft controls via appropriate transmission means a valve 35 in the pressure pipe 12 of pump 11 so as to close and open same in succession in order to effect a pulsating movement of the liquid passage through pipe 12.

Shaft 33 is adapted to be rotated in steps in order, by means of valves 9 and 25, to control the connection between suction pipe 10 of pump 11 and discharge pipe 24 of basin 23 on the one hand and the tanks 1, 2, 3 and 4 on the other hand via pipes 5, 6, 7, 8 and 26, 27, 28, 29 respectively. The stepwise rotation of shaft 33 is controlled by a gearing 36 driven from a continuously running motor 37 via a belt or rope transmission 38 which may be constructed according to well-known principles. It is, therefore, not considered necessary to illustrate the detailed construction thereof, as this does not form any part of the present invention.

The operation of the apparatus described is as follows:

On each spray tube 14 of a rotatable frame the operator places one of the four teat cups belonging to the same cluster. In doing so the operator allows each teat cup to drop until the nozzle 20 at the top of the respective spray tube engages the mouth of the milk tubing 40 connected to the teat cup which is connected at its opposite end to a manifold 41 common to the tubings of all of the teat cups of the cluster. The manifold 41 is clamped to the uppermost portion of the stem 16 by appropriate fastening means, not shown. The spray tubes 14 should be positioned in such a relation to each other as to allow the cover 42 belonging to the milk container of the milking machine and the milk tubing 43 leading from the manifold 41 to said container to be placed therebetween.

In the position of the four-way valves 9 and 25 shown in the drawing, cold water is sucked from tank 1 via pipe 5 and four-way valve 9 to suction pipe 10 of pump 11 and is thence forced through pipe 12 to the feed pipe 13 which distributes the water to the spray tubes 14 of the rinsing frames and to the stationary spray tubes 21. In addition, part of the water is expelled through the nozzles 19 for effecting a rotation of the blade wheels 18. The rinsing frames are thus caused to rotate at a suitable speed so as to allow the teat cups and other parts of the milking machine carried by the frames to be externally cleansed on all sides by the water discharged from the stationary spray tubes 21.

The liquid, that is to say, in the case under consideration, the cold water delivered to the spray tubes 14, effects an internal rinsing both of the teat cups themselves and the associated tubings 40, in as much as the teat cups and the tubings 40 act as branches of the fluid circulating system including the distributing pipe 13. After passing through tubings 40 the water enters the manifold 41 and passes therefrom through tubing 43 to be then discharged to the surrounding housing, along the inclined bottom 22 of which the waste water flows to the basin 23. In the position of valve 31 shown in the drawing the water collected in the basin is discharged through conduit 24 and passed via valve 25 to pipe 26 and back to the cold water tank 1. Near the end of the cold water washing time the cam 32 effects a shifting of valve 31 so as to cause the last portion of the cold water collected in the basin 23 to run off through drain pipe 30.

Due to the pulsation as caused by the alternate closing and opening of valve 35 the effect of the washing operation may be considerably enhanced.

After the elapse of a certain period, as predetermined by the control mechanism 36 the control shaft 33 is rotated by a quarter of a revolution. At valve 9 pipe 5 is disconnected from pipe 10 and pipe 6 connected thereto. At valve 25 pipe 26 is disconnected from pipe 24 and pipe 27 is connected thereto. Furthermore, flap valve 31 is restored to its prior position thereby disconnecting the basin from discharge pipe 30 and connecting it to conduit 24. As a result, tank 2 is connected to the pump and return pipe 27 is connected to the basin 23. The rinsing operation will now proceed with the liquid from tank 2 in the same way as already described with relation to the cold water withdrawn from tank 1.

After the elapse of the prescribed period of time the four-way valves 9 and 25 as well as flap valve 31 are again shifted in order to let the rinsing operation proceed with the hot washing water from tank 3 and, after still another interval, shaft 3 is again shifted to put the disinfection liquid from tank 4 into operation. In the operation with the disinfection liquid, however, the flap valve 31 is not shifted to put the basin into communication with the drain pipe 30. This is for the reason that no part of the disinfection liquid may be lost. After the elapse of the time determined for the operation of the disinfection liquid, the pump motor and the driving motor 37 of the control mechanism 36 is interrupted by means, not shown, thereby interrupting the operation of the apparatus on the whole.

The tanks 1, 2, 3 and 4 hereinbefore only generally referred to are, preferably, open-topped and rotatably mounted at their lower front edges, so that they may be easily dropped forwardly to a position suitable for cleansing them and filling them with the respective liquids.

As to the detailed construction of the apparatus shown in Fig. 1 it is, of course, possible to make modifications within the scope of the invention. For instance, the number of tanks, as 1, 2, 3 and 4, may be more or less than four, according as it is desired to use a less number of operating liquids or a greater number thereof.

Other modifications may refer to the means for passing the liquids to and from the spray tubes. Such a modification is indicated in Fig. 2. The intermittently rotating control shaft 33 is here shown as projecting up into the basin 23. The discharge pipe 24 of Fig. 1 is omitted and so is the four-way valve 25, the return pipes being directly connected to the basin 23, as shown in the drawing in respect of two diametrically opposite pipes 26 and 28. On its top end within the basin 23 each return pipe carries a flap valve 50. The flap valves are opened in successive order according as the shaft 33 rotates, the shaft to this end carrying a cam 51 for cooperation with projecting parts of the flap valves. Flap valve 31 controls in this case only the connection between the basin and the drain pipe 30.

With flap valve 31 closed the liquid collecting in basin 23 passes through pipe 24 via valve 25 to depending one of the tanks 1–4 depending on which of the pipes 26–29 is connected with conduit 24 through valve 25. With flap valve 31 open the liquid will be discharged through drain pipe 30, so that the liquid will readily sink below the level of flap 50 in the basin 23, thereby interrupting the return flow to the eventually connected tank.

As it might be preferred to let the cleansed goods remain on the supporting frames til it shall again be used at the next milking occasion, the frames should be enclosed in order to protect the goods against dust while at the same time making them readily accessible. To this end the frames may be enclosed in a casing having a door opposite each frame, as indicated in Fig. 3, where the reference numeral 60 designates a casing adapted to contain four frames. To each of the frames leads a door 61. It is also to be noted that the tanks should be well closed to the atmosphere. In Fig. 3 is also indicated a housing 62 containing four tanks 1, 2, 3, 4 said housing forming at the same time a support for the casing 60 enclosing the frames. The tanks are shown as provided with handles 63 at their tops. They are assumed to be rotatable around shafts at their lower front edge in order to enable the operator to drop them forwardly by grasping the handles. In order to allow this movement suitable ports are provided in the front wall of the housing, which are normally closed by the front walls of the tanks. A compartment 64 by the side of the tank compartments serves to receive the control mechanism, the pumping machinery and the associated parts.

What I claim is:

1. A machine for cleansing milking machines which comprises in combination, a carrying unit for supporting the elements to be cleaned, said unit including a number of rotatably mounted carriers for supporting a teat cup cluster and associated tubings and other milk conveying elements on each carrier, a conduit for supplying a liquid under pressure to said carriers, each carrier comprising a number of upstanding spraying tubes having each a nozzle to fit into the bottom end of a teat cup, a tubular shaft connected to said supplying conduit and rotatably mounted thereon for supporting each carrier a blade wheel rigidly connected with each carrier for rotating same under the influence of liquid under pressure delivered by the supplying conduit, and tubular standards rigidly connected with the supporting conduit in the spaces between the carriers, said standards having apertures for spraying liquid under pressure towards the carriers and the elements supported thereby.

2. A machine as claimed in claim 1, and in which a plurality of individual liquid containers are provided connected at their lower portions with means for passing liquid from any desired container to the supporting conduit referred to in claim 1.

3. A machine as claimed in claim 2, and in which the said means for selectively connecting the containers to the supporting conduit for the rotary carriers comprises a mechanically driven shifting mechanism and multiple-way valves for bringing the containers in a pre-determined order in communication with the said supplying conduit.

4. A machine as claimed in claim 3, and in which a common casing is provided surrounding all of the rotary carriers for the elements to be cleaned, said casing having an inclined bottom for outflow purposes.

5. A machine as claimed in claim 4, and in which a basin is connected to the lowermost portion of said inclined bottom to receive the effluent from the casing.

6. A machine as claimed in claim 5, and in which said basin is connected by a conduit to a valve for controlling the flow of said effluent to the various liquid containers.

7. A machine as claimed in claim 6, and in which basin has connected thereto a discharge conduit, a valve being provided for alternately opening one of the conduits communicating with the basin and closing the other conduit.

8. A machine as claimed in claim 7, and in which said valve is operable in such a way as to maintain the connection between the basin and the discharge conduit interrupted during the main part of the cycle of operation of the machine but to open it toward the end of said cycle.

ERIC REDIN.

REFERENCES CITED

The following references are of record in the file of this patent:

UNITED STATES PATENTS

| Number | Name | Date |
|---|---|---|
| 843,555 | Weymar | Feb. 5, 1907 |
| 910,882 | Truesdell | Jan. 26, 1909 |
| 1,172,300 | Murray | Feb. 22, 1916 |
| 1,703,946 | Melish | Mar. 5, 1929 |
| 1,741,329 | Montgomery | Dec. 31, 1929 |
| 1,765,557 | Wright | June 24, 1930 |
| 1,941,660 | Collins | Jan. 2, 1934 |
| 1,946,400 | Hapgood | Feb. 6, 1934 |
| 2,065,466 | Horn | Dec. 22, 1936 |
| 2,228,520 | Hodsdon | Jan. 14, 1941 |
| 2,391,973 | Hunter | Jan. 1, 1946 |
| 2,475,407 | Sell | July 5, 1949 |